United States Patent
Kim (10) Patent No.: US 12,318,062 B2
(45) Date of Patent: Jun. 3, 2025

(54) MOBILE ROBOT AND CONTROL METHOD THEREFOR

(71) Applicant: LG ELECTRONICS INC., Seoul (KR)

(72) Inventor: Byeongju Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 17/908,586

(22) PCT Filed: Mar. 3, 2021

(86) PCT No.: PCT/KR2021/002631
§ 371 (c)(1),
(2) Date: Sep. 1, 2022

(87) PCT Pub. No.: WO2021/177724
PCT Pub. Date: Sep. 10, 2021

(65) Prior Publication Data
US 2023/0096516 A1    Mar. 30, 2023

(30) Foreign Application Priority Data
Mar. 4, 2020 (KR) .................. 10-2020-0027365

(51) Int. Cl.
*A47L 9/28* (2006.01)
(52) U.S. Cl.
CPC ............ *A47L 9/2894* (2013.01); *A47L 9/2805* (2013.01); *A47L 2201/022* (2013.01); *A47L 2201/04* (2013.01)

(58) Field of Classification Search
CPC ............ A47L 2201/00; A47L 2201/04; A47L 9/2894; A47L 9/2805; A47L 9/2815
See application file for complete search history.

(56) References Cited

U.S. PATENT DOCUMENTS

2008/0174268 A1* 7/2008 Koo ................ B25J 19/005
                                                   320/109
2018/0098676 A1    4/2018 Ryu et al.

FOREIGN PATENT DOCUMENTS

EP    1 963 940         9/2009
FR    2877110 A1 *      4/2006  .............. A47L 11/00
(Continued)

OTHER PUBLICATIONS

International Search Report dated Jun. 30, 2021 issued in Application No. PCT/KR2021/002631.
(Continued)

*Primary Examiner* — Maurice C Smith
(74) *Attorney, Agent, or Firm* — KED & ASSOCIATES, LLP (57) ABSTRACT

A mobile robot and a control method therefor, according to the present invention, are configured to determine whether a received signal is a pre-set signal and distinguish noise caused by overlapping of signals to control the operation of a sensor for detecting an obstacle according to an operation state of a main body such that transmission of a detection signal is limited, and thus has effects of the obstacle being easily detected by distinguishing each signal, the main body returning to a charging stand, and signal interference being minimized for a plurality of sensors using a signal of the same wavelength band.

14 Claims, 7 Drawing Sheets

(56) References Cited

FOREIGN PATENT DOCUMENTS

| | | | |
|---|---|---|---|
| JP | 2006-239797 | | 9/2006 |
| JP | 2006239797 A | * | 9/2006 |
| KR | 10-0692897 | | 3/2007 |
| KR | 10-0850227 | | 8/2008 |
| KR | 10-2009-0088587 | | 8/2009 |
| KR | 102404258 B1 | * | 2/2015 |
| KR | 10-1620449 | | 5/2016 |
| KR | 10-2017-0079205 | | 7/2017 |

OTHER PUBLICATIONS

European Search Report issued in Application No. 21764338.6 dated Mar. 6, 2024.

* cited by examiner

FIG. 8

MOBILE ROBOT AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2021/002631, filed Mar. 3, 2021, which claims priority to Korean Patent Application No. 10-2020-0027365, filed Mar. 4, 2020, whose entire disclosures are hereby incorporated by reference.

TECHNICAL FIELD

The present disclosure relates to a mobile robot and a method of controlling the mobile robot, the mobile robot and method recognizing obstacles while running in a region.

BACKGROUND ART

In general, a mobile robot is a device that automatically cleans by suctioning foreign substances such as dust from a floor while autonomously running in a section to clean even without operation by a user.

A mobile robot can make a map of a region to clean while running in the region. A mobile robot can clean while running on the basis of a created map. A mobile robot runs while avoiding obstacles by sensing obstacles positioned in a region during running.

A mobile robot autonomously runs using the charge current stored in a battery as an operation source. A mobile robot can charge a battery by returning to a charging stand by receiving a signal that is transmitted from the charging stand.

However, a mobile robot not only has a plurality of sensors, but is configured to transmit/receive and process various signals, so there is a problem of interference of signals. There is a problem that such interference of signals generates unnecessary noise. Accordingly, a mobile robot may be interrupted due to such interference of signals when returning to a charging stand, and may sense obstacles wrong due to influence between signals.

Korean Patent No. 10-1620449 describes that a robot cleaner includes an IR sensor that receives IR signals of a transmitter that are transmitted in a plurality of directions, determines transmission directions in accordance with the IR signals, estimates transmission directions by removing return signals, and returns to a charging stand.

This invention of the related art removes return signals of IR signals, but does not consider interference with signals, which are transmitted from sensor, etc. of a mobile robot, so there is a limit.

Accordingly, there is a need for improvement of preventing mutual interference of not only a signal of a charging stand, but a plurality of signal that a mobile robot transmits and receives, and making it easy to sense obstacles and dock with a charging stand.

DISCLOSURE

Technical Problem

An object of the present disclosure is to provide a mobile robot that minimizes signal interference between the mobile robot and a charging stand, and a method of controlling the mobile robot.

Another object of the present disclosure is to discriminate a plurality of sensor signals of a plurality of sensors using signals of the same wavelength band.

Another object of the present disclosure is to avoid interference between signals, which are output from a plurality of sensor that is disposed in a mobile robot and senses obstacles, and a docking signal of a charging stand.

Another object of the present disclosure is to minimize mis-sensing of obstacles by recognizing sensing signals of the obstacles.

Another object of the present disclosure is to return to a charging stand by recognizing a docking signal of a charging stand.

The objects of the present disclosure are not limited to those described above and other objects not stated herein may be clearly understood by those skilled in the art from the following description.

A mobile robot according to an embodiment of the present disclosure for achieving the objects and a control method thereof are characterized by discriminating a plurality of signals by discriminating signals through an operation state when a received signal is a preset signal.

The present disclosure is characterized by discriminating a plurality of signals of the same wavelength bands by determining whether a signal is a pre-agreed signal.

The present disclosure is characterized by controlling a sensing signal and a docking signal in accordance with whether a mobile robot is cleaning or moving to a destination.

The present disclosure is characterized by discriminating signals by determining whether there is noise for received signals.

The present disclosure is characterized by determining whether there is mis-sensing by comparing the pattern of a received signal.

The present disclosure is characterized by preventing interference of signals by adjusting a signal generation cycle.

The present disclosure is characterized by discriminating received signals by limiting some signal when a signal is sensed wrong.

The present disclosure is characterized by preventing interference of signals by temporarily stopping operation of some sensors in accordance with a received signal.

The present disclosure is characterized by discriminating signals in accordance with a set signal cycle of a plurality of signals of the same wavelength band.

A mobile robot of the present disclosure includes: a main body running in a region; a sensor unit disposed on a front of the main body and sensing an obstacle located at a predetermined distance from the main body by transmitting a sensing signal; a docking signal receiving unit receiving a docking signal that is transmitted from a charging stand; a running unit controlling running of the main body; and a control unit determining the location of an obstacle in response to the sensing signal, controlling running in response to an obstacle, and controlling the running unit to dock with the charging stand in accordance with the docking signal if charging is required, wherein the control unit controls the sensor unit to transmit a sensing signal with a cycle different from a signal transmission cycle of the docking signal, and determines that a signal is sensed wrong and stops operation of the sensor unit for a predetermined time when noise is generated due to overlap of the docking signal and the sensing signal.

A method of controlling a mobile robot of the present disclosure includes: sensing an obstacle by transmitting sensing signals from a plurality of sensors disposed on a front of a main body during running; determining the location of an obstacle in response to the sensing signal and performing a designated operation in response to the obstacle; stopping operation and moving to a charging stand when charging is required; determining that a signal is sensed wrong when noise is generated due to overlap of the docking signal of the charging stand and the sensing signal; stopping operation of the plurality of sensors for a designated stop time; and docking with the charging stand in accordance with the docking signal.

Advantageous Effects

The mobile robot and the control method therefor of the present disclosure can minimize signal interference between the mobile robot and the charging stand.

The present disclosure can minimize signal interference of a plurality of sensor using signals of the same wavelength band and can discriminate the signals.

The present disclosure can minimize interference by determining and coping with whether there is mis-sensing due to interference of docking signal for returning to the charging stand and the sensing signal of the sensor and by adjusting transmission cycles of signals.

In the present disclosure, a plurality of sensors that senses an obstacle by discriminating a plurality of signals can easily sense an obstacle through sensing signals.

The present disclosure can minimize mis-sensing of obstacles by recognizing sensing signals of the obstacles.

The present disclosure can easily return to the charging stand by recognizing a docking signal of the charging stand.

The present disclosure can prevent misoperation of each device by minimizing signal interference of a plurality of devices that uses signals of the same wavelength band.

The present disclosure can minimize limitation in use due to signal interference for a plurality of sensors provided in a device.

The present disclosure can independently operate in the same space by minimizing signal interference with a pre-installed product.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

MODE FOR DISCLOSURE

The advantages and features of the present disclosure, and methods of achieving them will be clear by referring to the exemplary embodiments that will be describe hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims. Like reference numerals indicate like components throughout the specification. A control configuration of the present disclosure may be composed of at least one process.

Figure 1:
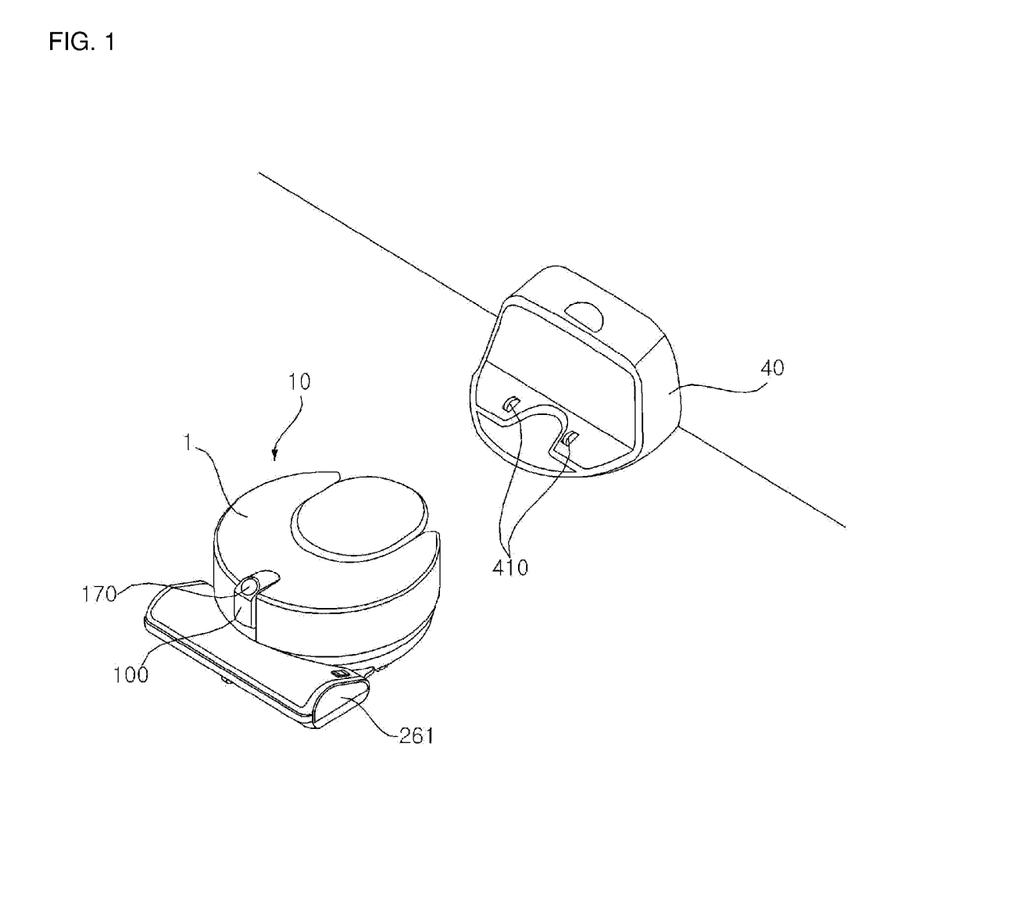
FIG. 1 is a perspective view showing a mobile robot according to an embodiment of the present disclosure.

FIG. 1 is a perspective view showing a mobile robot according to an embodiment of the present disclosure.

Referring to FIG. 1, a mobile robot 1 according to an embodiment of the present disclosure includes a main body 10 that suctions foreign substances such as dust on a floor while moving along the floor of a cleaning section, and a sensing unit 100, 170 that is disposed on the front surface of the main body 10 and senses obstacles.

The main body 10 may include a casing (not shown) that forms the external shape and a space therein in which parts constituting the main body 10 are accommodated, a suction unit 261 that is disposed in the casing and suctions foreign substances such as dust or waste, and a left wheel (not shown) and a right wheel (not shown) that are rotatably provided at the casing. As the left wheel and the right wheel are rotated, the main body 10 moves along the floor of a cleaning section, and in this process, foreign substances are suctioned through a suction port (not shown) formed toward a floor surface.

The suction unit 21 may include a suction fan (not shown) that generates a suction force, and a suction port (not shown) through which airflow generated by rotation of the suction fan is suctioned. The suction unit 261 may include a filter (not shown) that collects foreign substances from the airflow suctioned through the suction port, and a foreign substance collection container (not shown) in which foreign substances collected by the filter are accumulated.

The suction unit 261 includes a rotary brush (not shown) and assists collection of foreign substances by rotating simultaneously with suctioning airflow. The suction unit is detachably configured, if necessary. The main body 10 may further include a plurality of brushes (not shown) positioned at the front of the bottom of the casing and having a brush composed of several wings radially extending.

Further, a damp cloth cleaning unit may be attached and detached to and from the suction unit 261. The damp cloth cleaning unit may be attached to the rear surface of the suction port. Depending on cases, the damp cloth cleaning unit may be configured separately from the suction unit and may be replaced and mounted at a location where it is fastened and fixed to the suction unit. The damp cloth cleaning unit wipes a floor surface in a running direction while rotating during moving.

The main body 10 may include a running unit (not shown) that drives the left wheel and the right wheel. The running unit may include at least one driving motor.

The main body 10 may further include a plurality of brushes (not shown) positioned at the front of the bottom of the casing and having a brush composed of several wings radially extending. The plurality of brushes removes dust from the floor of a cleaning section by rotating and the dust separated from the floor in this way is suctioned through the suction port and collected in the collection container.

A control panel including an operation unit (not shown) that receives various input instructions for controlling the mobile robot 1 from a user may be provided on the top of the casing.

The sensing unit includes an obstacle sensing unit 100, a sensor unit (not shown) composed of a plurality of sensors, and an imaging unit 170 that takes pictures. Depending on cases, the obstacle sensing unit 100 may include the imaging unit 170 and a sensor unit 150.

As the obstacle sensing unit 100, a 3D sensor that senses obstacles through an image that is taken by emitting a light pattern may be used. Further, the obstacle sensing unit 100 can sense obstacles in the running direction using ultrasonic waves, infrared light, and laser. The obstacle sensing unit 100 is composed of at least one camera and can sense obstacles from an image that is taken by the camera1.

The obstacle sensing unit 100 may be dispose on the front surface of the main body 10.

The obstacle sensing unit 100 is fixed to the front surface of the casing and includes a first pattern emitter (not shown), a second pattern emitter (not shown), and a pattern obtainer (not shown). In this case, the pattern obtainer is installed at a lower portion of a pattern emitter or between the first and second pattern emitter and can take an image of an emitted pattern. The first pattern emitter and the second pattern emitter emit a patter an a predetermined emission angle.

The imaging unit 170 takes images in the running direction of the mobile robot 1. Further, the imaging unit 170 can image the front in the running direction or the upper portion in the running direction, for example, a ceiling. The imaging unit 170 may be provided to face a ceiling or may be provided to face a front and may take images in the running direction. Further, the imaging unit 170 may simultaneously image the front and the upper portion of the running direction, that is, a ceiling, depending on the installation position on the main body 10 and an installation angle in the running direction. The imaging unit may be set such that the angle of view for imaging is different in accordance with the performance of an installed camera or the kind of a lens.

The imaging unit 170 is exemplified as including at least one camera in the description, and any device can be applied as long as it is an imaging unit that takes images regardless of the kinds of cameras.

The imaging unit 170 may include a plurality of cameras and two cameras facing the front, and a ceiling are installed on the front surface and the upper end of the main body, respectively, and can take images of the front and the ceiling, respectively. Further, the imaging unit 170 may include a separate camera that images a floor surface.

The sensor unit 150 includes an infrared sensor, an ultrasonic wave sensor, and a laser sensor and can sense obstacles. Further, the sensor unit 150 can sense the inclination of the main body by including an inclination sensor, for example, a tilting sensor, a gyro sensor, etc., and can sense the brightness of the region in which the main body 10 is positioned by including an illumination sensor.

The mobile robot 1 may further include a locating unit (not shown) for obtaining current location information. The mobile robot 1 determines the current location by including a GPS and a UWB.

A rechargeable battery (not shown) is provided in the main body, and a charging terminal (not shown) of the battery is connected to a commercial power (e.g., a power socket in home) or the main body 10 is docked with a separate charging stand 40 connected with the commercial power, so the charging terminal can be electrically connected with the commercial power through contact with a terminal 410 of the charging stand and the battery can be charged. Electronic parts constituting the mobile robot 1 can be supplied with power from the battery, and accordingly, the mobile robot 1 can run by itself with the battery charged in a state in which the mobile robot 1 is electrically separated from the commercial power.

Figure 2:
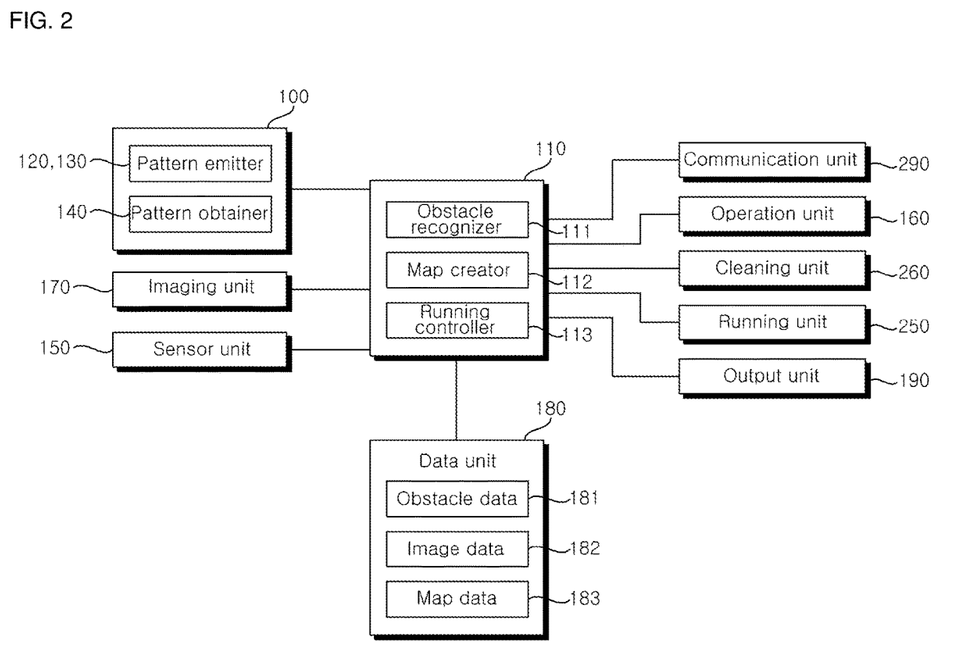
FIG. 2 is a block diagram showing main parts of the mobile robot according to an embodiment of the present disclosure.

FIG. 2 is a block diagram showing main parts of the mobile robot according to an embodiment of the present disclosure.

As shown in FIG. 2, the mobile robot 1 includes a running unit 250, a cleaning unit 260, a data unit 180, an obstacle sensing unit 100, an imaging unit 170, a sensor unit 150, a communication unit 290, an operation unit 160, an output unit 190, and a control unit 110 that controls general operation.

The operation unit 160 receives user input instructions by including an input unit such as at least one button, switch, a touch pad, or the like. The operation unit, as described above, may be provided at the upper end of the main body 10.

The output unit 190 includes a display such as an LED and an LCD and displays an operation mode of the mobile robot 1, schedule information, a battery state, an operation state, an error state, etc. Further, the output unit 190 outputs a predetermined effect sound, a warning sound, or a voice guidance corresponding to the operation mode, schedule information, battery state, operation state, and error state by including a speaker or a buzzer.

In the data unit 180, obtained images input from the obstacle sensing unit 100 are stored, reference data for an obstacle recognizing unit 111 to determine obstacles are stored, and obstacle information about sensed obstacles is stored.

The data unit 180 stores obstacle data 181 for determining the kinds of obstacles, image data 182 storing taken images, and map data 183 about regions. In the map data 183, obstacle information is included and various types of maps for available running regions that are searched by the mobile robot are stored.

For example, a fundamental map including information about available running regions searched by the mobile robot, a cleaning map in which regions are divided from the fundamental map, a user map created for a user to be able to recognize the shapes of regions, and a guide map in which the cleaning map and the user map are shown in an overlap state may be stored.

The obstacle data 181 includes the locations and sizes of sensed obstacles. Further, the obstacle data 181 may include information for recognizing obstacles and determining the kinds of obstacles, and information about operations set in response to obstacles. The obstacle data includes motion information about the operation of the mobile robot, for example, a running speed, a running direction, whether to avoid or not, whether to stop or not, etc., for sensed obstacles, and information about an effect sound, a warning sound, and a sound guidance that are output through the speaker 173. The image data 182 may include taken images, for example, a still image, a video, and a panorama image.

Further, control data for controlling operation of the mobile robot, data according to a cleaning mode of the mobile robot, and sensing signals of ultrasonic wave/laser, etc. by the sensor unit 150 are stored in the data unit 180.

Further, the data unit 180, which stores data that can be read by a microprocessor, may include a storage device such as an HDD (Hard Disk Drive), an SSD (Solid State Disk), an SDD (Silicon Disk Drive), a ROM, a RAM, an EPROM, an EEPROM, a flash memory, etc.

The communication unit 290 communicates with a terminal 80 in a wireless communication type. Further, the communication unit 290 can communicate with an external server 90 or a terminal 80 that controls the mobile robot by being connected to the internet through a home network.

The communication unit 290 transmits a created map to the terminal 80, receives a cleaning instruction from the terminal, and transmits data about the operation state and cleaning state of the mobile robot to the terminal. Further, the communication unit 290 can transmit information about obstacles sensed during running to the terminal 80 or the server 90.

The communication unit 290 transmits and receives data by including a communication module such as near field wireless communication, such as Zigbee and Bluetooth, WiFi, Wibro, etc.

The communication unit 290 can receive a charging stand return signal or a guide signal for charging stand docking while communicating with the charging stand 40. The mobile robot 1 searches out the charging stand on the basis of a signal that is received through the communication unit 290 and docks with the charging stand.

Meanwhile, the terminal 80 is a device that can connect with a network by being equipped with a communication module and in which a program for controlling the mobile robot or an application for controlling the mobile robot is installed, and devices such as a computer, a laptop, a smartphone, a PDA, a tablet PC, etc. may be used. Further, a wearable device such as a smart watch, etc. may be used as the terminal.

The running unit 250 includes at least one driving motor such that the mobile robot runs in accordance with a control instruction of the running control unit 113. The running unit 250, as described above, may include a left wheel driving motor that rotates a left wheel 36L and a right wheel driving motor that rotates a right wheel 36R.

The cleaning unit 260 makes a state in which dust or foreign substances around the mobile robot are easily suctioned by operating brushes, and suctions dust or foreign substances by operating a suction device. The cleaning unit 260 controls operation of the suction fan provided in the suction unit 261 that suctions foreign substances such as dust, waste, etc. such that dust is put into the foreign substance collection container through the suction port.

Further, the suction unit 260 may further include a damp cloth cleaning unit (not shown) that is installed at the rear of the bottom of the main body and wipes a floor surface with a damp cloth in contact with the floor surface, and a water tank that supplies water to the damp cloth cleaning unit. The cleaning unit 260 may be equipped with a cleaning tool. For example, a damp cloth pad may be mounted on the damp cloth clean unit and may clean a floor surface. The cleaning unit 260 may further include a separate driving unit that transmits a rotation force to the damp cloth pad of the damp cloth clean unit.

The battery (not shown) supplies power not only for the driving motor, but for the general operation of the mobile robot 1. When the battery is fully discharged, the mobile robot 1 can run to return to the charging stand 40 for charging, and the mobile robot 1 can search for the location of the charging stand by itself during this return running. The charging stand 40 may include a signal transmitter (not shown) that transmits a predetermined return signal. The return signal may be an ultrasonic wave signal or an infrared signal, but is not necessarily limited thereto.

The obstacle sensing unit 100 emits a predetermined shape of pattern and obtains an image of the emitted pattern. The obstacle sensing unit 100 may include at least one pattern emitter (not shown) and a pattern obtainer. Depending on cases, the imaging unit 170 may operate as the patter obtainer.

Further, the obstacle sensing unit 100 can sense the locations and distances of obstacles positioned in the running direction by including an ultrasonic wave sensor, a laser sensor, and an infrared sensor. Further, the obstacle sensing unit 100 can sense obstacles from images in the running direction. The sensor unit and imaging unit may be included in the obstacle sensing unit.

The sensor unit 150 senses obstacles by including a plurality of sensors. The sensor unit 150 senses obstacles at the front, that is, in the running direction using at least one of a laser, an ultrasonic wave, and infrared light.

Further, the sensor unit 150 may further include a step sensing sensor that senses whether a step exists on the floor in a running section. When receiving a signal transmitted and reflected, the sensor unit 150 inputs information about whether an obstacle exists or the distance to an obstacle to the control unit 110 as an obstacle sensing signal.

The sensor unit 150 senses the inclination of the main body by including at least one inclination sensor. When the main body inclines forward, rearward, left, and right directions, the inclination sensor calculates the inclination direction and angle. A tilt sensor, an acceleration sensor, etc. may be used as the inclination sensor, and when it is an acceleration sensor, any of a gyro type, an inertia type, and a silicon semiconductor type can be applied.

Further, the sensor unit 150 can sense an operation state and whether there is a problem or not through a sensor installed in the mobile robot 1.

The obstacle sensing unit 100 may include a pattern emitter, a light source, and an Optical Pattern Projection Element (OPPE) that creates a predetermined pattern by transmitting light emitted from the light source. The light source may be a Laser Diode (LD), a Light Emitting Diode (LED), or the like. A laser beam is excellent in the characteristics of monocolor, straightness, and connection in comparison to other light sources, so it can measure a precise distance. In particularly, infrared light or visible light generates a large difference in precision of distance measurement, depending on the color, the material, etc. of an object, so a laser diode is preferable as a light source. The OPPE may include a lens, and a Diffractive optical element (DOE). Various patterns of light can be emitted in accordance with the configuration of the OPPE provided in each pattern emitter.

The pattern obtainer 140 can obtain an image of the front of the main body or an image of a ceiling. In particular, pattern light is shown in an image obtained by the pattern obtainer 140 (hereafter, referred to as an obtained image), and hereafter, the phase of the pattern light shown in an obtained image is referred as a light pattern and this is actually a phase of pattern light traveling into a space and formed on an image sensor. When a pattern emitter is not provided, the pattern obtainer obtains an image not including pattern light at the front of the main body.

The pattern obtainer may include a camera that converts the phase of an object into an electrical signal and then converts and store the electrical signal into a digital signal in a memory element. The camera may include at least one optical lens, an image sensor (e.g., a CMOS image sensor) including several photodiodes (e.g., pixels) in which images are formed by light that has passed through the optical lens, and a digital signal processor (DSP) that forms an image on the basis of signals output from the photodiodes. The digital signal processor can generate not only still images, but also moving images composed of frames composed of still images.

An image sensor is a device that converts an optical image into an electrical signal and is configured as a chip in which several photo diodes are integrated, and pixels may be exemplified as the photo diodes. Electrical charges are accumulated in each pixel by an image formed on a chip by light passing a lens, and the electrical charges accumulated in the pixels are converted into an electrical signal (e.g., voltage). A Charge Coupled Device (CCD), a Complementary Metal Oxide Semiconductor (CMOS), etc. are well known as image sensors.

The obstacle sensing unit 100 senses an obstacle in accordance with the shape of a pattern by analyzing the pattern by obtaining an image and the sensor unit 150 senses an obstacle positioned at a sensing distance of each sensor through provided sensors.

The imaging unit 170 continuously takes images when the mobile robot operates. Further, the imaging unit 170 can take images in the unit of a predetermined cycle or a predetermined distance. The imaging unit 170 can take an image when an obstacle is sensed by the obstacle sensing unit 100, and can take an image even in a moving or cleaning state when an obstacle is not sensed.

The imaging unit 170 can set an imaging cycle in accordance with the moving speed of the mobile robot. Further, the imaging unit 170 can set an imaging cycle in consideration of the sensing distance of the sensor unit and the moving speed of the mobile robot.

The imaging unit 170 not only can obtain an image of the front in the running direction, but can image a ceiling shape in the upward direction.

The imaging unit 170 stores images that are taken while the main body runs into the data unit 180 as image data 182.

The obstacle sensing unit 100 inputs information about the location or movement of sensed obstacles into the control unit 110. The sensor unit 150 can input a sensing signal of an obstacle sensed by a provided sensor into the control unit. The imaging unit 170 inputs a taken image into the control unit.

The control unit 110 controls the running unit 250 such that the mobile robot runs within a predetermined section of a running section.

The control unit 110 sets an operation mode of the mobile robot by processing data that are input by operation of the operation unit 160, outputs an operation state through the output unit 190, and outputs a warning sound, an effect sound, and voice guidance according to an operation state, an error state, or sensing of an obstacle through a speaker.

The control unit 110 creates a map about a running region on the basis of an image obtained from the imaging unit 170 or obstacle information sensed by the obstacle sensing unit 100. The control unit 110 creates a map on the basis of obstacle information while running in a region, that is, may create a map by determining a running region from an image of the imaging unit.

The control unit 110 recognizes an obstacle that is sensed by the imaging unit 170 or the obstacle sensing unit 100, and controls the running unit by correspondingly performing a specific operation or changing the route. Further, the control unit, if necessary, can output a predetermined effect sound or warning sound through the output unit and can control the imaging unit to take images.

The control unit 110 controls the running unit 250 and the cleaning unit 260 while running to suction dust or foreign substances around the mobile robot, so cleaning of the running section is performed. Accordingly, the cleaning unit 260 makes a state in which dust or foreign substances around the mobile robot are easily suctioned by operating brushes, and suctions dust or foreign substances by operating a suction device. The cleaning unit is controlled to perform cleaning by suction foreign substances during running.

The control unit 110 determines the time to return to the charging stand by checking the charging capacity of the battery. When the charging capacity reaches a predetermined value, the control unit 110 stops the operation that is being performed, and starts to search for the charging stand to return to the charging stand. The control unit 110 can output an alarm about the charging capacity of the battery and an alarm about returning to the charging stand. Further, when a signal transmitted from the charging stand is received through the communication unit 290, the control unit 110 can return to the charging stand.

The control unit 110 controls signal transmission cycles so that the signals of a plurality of sensors using signals of the same wavelength band can be discriminated.

The control unit 110 controls signal transmission cycles for the sensor unit, the obstacle sensing unit, and the charging stand. Further, when it is impossible to control a docking signal of the charging stand, the control unit 110 correspondingly changes the cycles of the sensors provided in the main body.

The control unit 110 discriminates signals by determining whether received signals are signals that are received in accordance with designated cycles.

When interference of signal is generated and when missensing of a sensor is generated, the control unit 110 temporarily stops the operation of some sensors so that signals of other sensors can be received.

Accordingly, the mobile robot can prevent signal interference by changing the signal transmission cycles.

The control unit 110 includes an obstacle recognizer 111, a map creator 112, and a running controller 113.

In an initial operation or when a map about a region is not stored, the map creator 112 creates a map about a region on the basis of obstacle information while running in the region. Further, the map creator 112 updates the created map on the basis of obstacle information that is obtained during running.

Further, the map creator 112 creates a map by determining the shape of a region by analyzing images that are obtained during running. The map creator 112 extracts a characteristic point by analyzing images and determines the shape of a region from the extracted characteristic.

The map creator 112 can determine the shape of a region by arranging a plurality of images or videos that is taken through the imaging unit in accordance with a location change of the mobile robot or the flow of time and matching the images or videos to locations.

Further, the map creator 112 can recognize from the characteristic extracted from an image. The map creator 112 can determine the location of a door on the basis of connection relationship of characteristics, and accordingly, can create a map composed of a plurality of regions by separating the boundaries of the regions.

The map creator 112 forms reference lines by connecting and separating extracted characteristics, and finally determines the shape of regions on the basis of the characteristics.

The obstacle recognizer 111 determines obstacles through data that are input from the imaging unit 170 or the obstacle sensing unit 100, and the map creator 120 creates a map about a running section and puts information about sensed obstacles into the map.

The obstacle recognizer 111 determines obstacles by analyzing data that are input from the obstacle sensing unit 100. The obstacle recognizer 111 calculates the direction of an obstacle or the distance to an obstacle in accordance with a sensing signal of the obstacle sensing unit, for example, a signal such as an ultrasonic wave or laser. When using an ultrasonic wave or infrared signal, there is a difference in the shape of received ultrasonic waves or in the time at which ultrasonic waves are received in accordance with the distances from obstacles or the locations of obstacles, the obstacle recognizer 111 determines obstacles on the basis of the differences.

The obstacle recognizer 111 extracts a pattern by analyzing an obtained image including the patter and determines obstacles by analyzing the shape of the pattern.

Further, the obstacle recognizer 111 can recognize a human body. The obstacle recognizer 111 senses a human body by analyzing data that are input through the obstacle sensing unit 100 or the imaging unit 170, and determines whether the human body is a specific user.

The obstacle recognizer 111 can determine whether a human body is a previously registered user when a human body is sensed by storing data of registered users, for example, images of users and characters of the shapes of users as data.

The obstacle recognizer 111 extracts characteristics of an obstacle by analyzing image data, and determines an obstacle and the location on the basis of the shape (form), size, and color of the obstacle.

The obstacle recognizer 111 can determine the kind of an obstacle by extracting characteristics of the obstacle on the basis of previously stored obstacle data except for the background of an image from image data. The obstacle data 181 are updated by new obstacle data that are received from a server. The mobile robot 1 can store obstacle data about sensed obstacles and receive data about the kinds of obstacles from the server for other data. Further, the obstacle recognizer 111 stores information of a recognized obstacle into the obstacle data and transmits recognizable image data to the server (not shown) through the communication unit 290 such that the kind of the obstacle is determined. The communication unit 290 transmits at least one image datum to the server.

The running controller 113 controls the running unit 250 to pass through an obstacle or avoid an obstacle by changing the moving direction or running route in response to obstacle information.

The running controller 113 independently controls operation of the left wheel driving motor and the right wheel driving motor by controlling the running unit 250 such that the main body 10 runs straight or turns. The running controller 113 controls the running unit 250 and the cleaning unit 260 in accordance with a cleaning instruction such that the main body 10 performs cleaning by suctioning foreign substances while running in a cleaning region.

The running controller 113 controls the running unit 250 to move to a set region or such that the main body moves in the set region on the basis of a map created by the map creator 112. Further, the running controller 113 controls the running unit to perform a predetermined operation or change the running route in response to an obstacle in accordance with a sensing signal of the obstacle sensing unit 100.

The running controller 113 controls the running unit to perform at least one of avoiding, approaching, setting of an approach distance, stop, decelerating, accelerating, backward running, U turn, and changing of the running direction in response to sensed obstacles.

Further, the running controller 113 can output an error and output a predetermined warning sound or voice guidance, if necessary.

Figure 3:
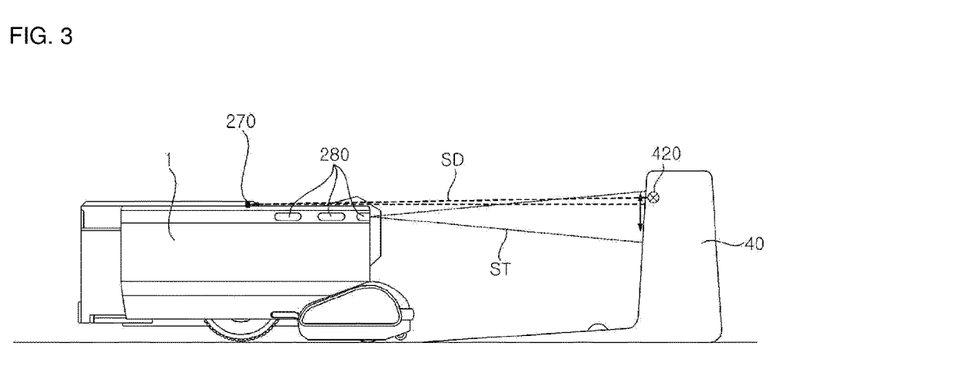
FIG. 3 is a view that is referred to describe signal interference of a mobile robot according to an embodiment of the present disclosure and a charging stand.

FIG. 3 is a view that is referred to describe signal interference of a mobile robot according to an embodiment of the present disclosure and a charging stand.

As shown in FIG. 3, the mobile robot 1 docks with the charging stand and charges the battery by being supplied with a charging current.

The charging stand 40 transmits a docking signal SD that induces docking of the mobile robot 1.

When charging is required and a docking signal SD transmitted from the charging stand 40 is received, the mobile robot 1 returns to the charging stand 40 and attempts to dock.

The charging stand 40 outputs a docking signal through a signal transmitter 420. An IR signal may be used as the docking signal.

The mobile robot 1 includes a plurality of sensors 280 provided on the front surface of the main body 10 other than the obstacle sensing unit 100. The plurality of sensors may be included in the sensor unit 150.

The plurality of sensors is installed on the front surface of the main body 10 toward a front and upper direction and transmits sensing signals ST. An IR signal may be used as the sensing signal ST. Time of Flight (TOF) may be used as the plurality of sensors.

When an IR signal is used for both the docking signal SD of the charging stand and the sensing signal ST of the sensor unit, signal interference may be generated. In particular, when the mobile robot attempts to dock with the charging stand, the main body faces the charging stand, so signal interference is generated. For example, misoperation may be generated by recognizing a docking signal as a sensing signal.

Other than when attempting to dock, when the mobile robot runs in a range that a docking signal reaches, the sensing signals of the sensors and the docking signal are signals of the same wavelength, so mutual interference may be generated.

Further, a sensing signal may be reflected by a side of the charging stand and then input to a docking signal receiving unit 270. In this case, the docking signal is interfered with by the sensing signal, so docking may fail.

As described above, while running around the charging stand or attempting to dock, the mobile robot may recognize a docking signal as a sensing signal or may recognize a sensing signal as a docking signal. Further, when a sensing signal is reflected by a surrounding obstacle or wall and travels into the receiver of a sensor, mis-sensing may be generated.

An IR signal of a wavelength band of 940 nm may be used as the docking signal and the sensing signal. The wavelength band may be changed, and the present disclosure may be applied to prevent interference by discriminating a plurality of signals of the same wavelength band.

Figure 4:
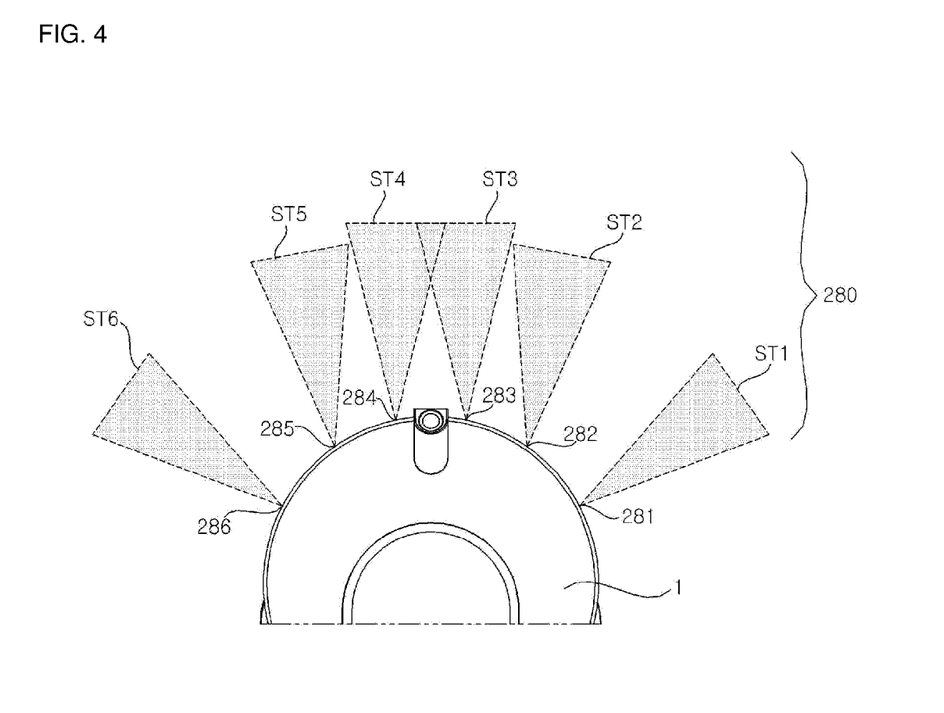
FIG. 4 is a view showing a sensing signal for sensing obstacles of the mobile robot according to an embodiment of the present disclosure.

FIG. 4 is a view showing a sensing signal of a sensor for sensing obstacles of the mobile robot according to an embodiment of the present disclosure.

As shown in FIG. 4, a plurality of sensors 280 is circumferentially arranged with regular intervals around the center of the front surface of the main body 10.

A sensor hole is formed in the casing of the main body 10 and the sensors 280 are each mounted on a circuit board (PCB) positioned inside the sensor hole, so first to sixth sensors 281 to 286 can transmit predetermined sensing signals ST1 to ST6 through the sensor hole and can sense an obstacle in accordance with received signals.

The first to sixth sensors 281 to 286 are each mounted on a circuit board (not shown), and a transmitter and a receiver are provided on one circuit board. The sensors 280 transmit and receive signals of laser, ultrasonic wave, infrared, etc., and hereafter, transmitting an infrared signal is exemplified. TOF sensors may be used as the plurality of sensors 280.

The circuit boards on which the first to sixth sensors are mounted, respectively, are connected to a main substrate (not shown) disposed at the center inside the main body 10, and controls sensing signals of the first to sixth sensors and senses obstacles through received signals. The circuit boards on which the first to sixth sensors are mounted, respectively, are connected to each other through flexible connectors and are connected with the main substrate.

The main substrate has a control unit, supplies operation power to a plurality of circuit boards on which the first to sixth sensors 281 to 286 are mounted, and receives and applies sensing signals from the first to sixth sensors 281 to 286 to the control unit 110. The control unit is composed of at least one process.

The first to sixth sensors 281 to 286 share a clock signal and a communication line and are connected to individual power lines, so they can be supplied with operation power. Signal values of the sensors can be applied to the control unit through the power lines. The control unit 110 receives sensing signals of the sensors through variation of voltage or current of the power lines.

Figure 5:
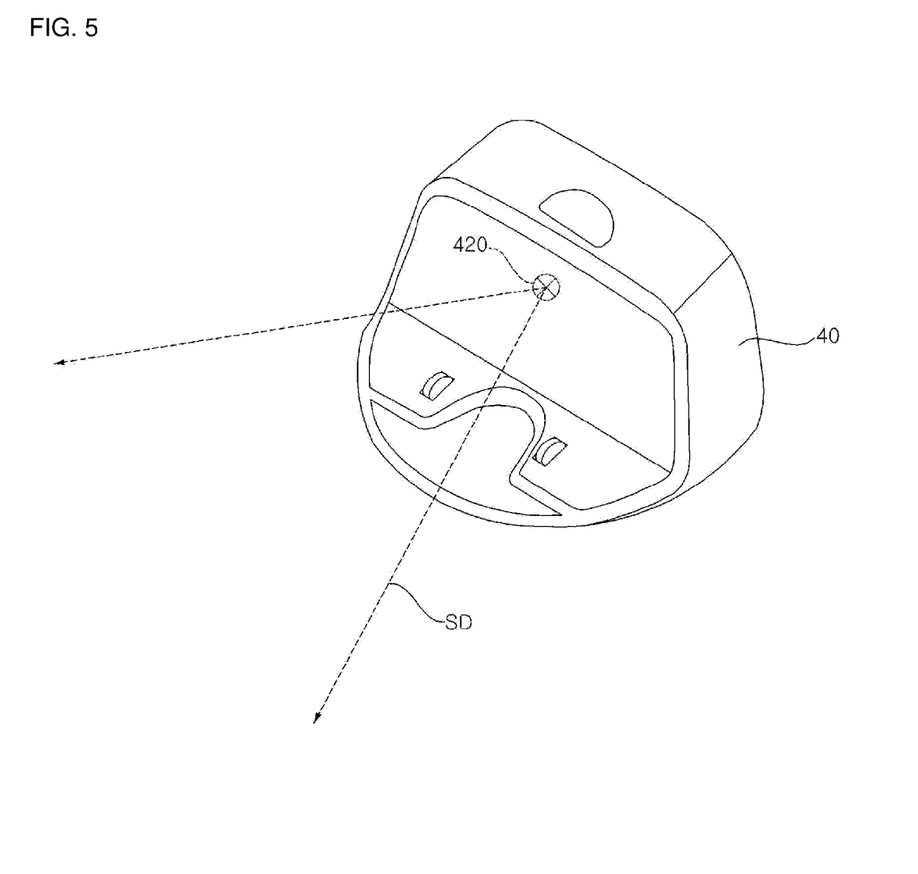
FIG. 5 is a view showing a docking signal of a charging stand according to an embodiment of the present disclosure.

FIG. 5 is a view showing a docking signal of a charge cradle according to an embodiment of the present disclosure.

As shown in FIG. 5, the charging stand 40 includes a charging terminal 410 and the signal transmitter 420. Further, the charging stand may include a proximity sensor that senses approach of the mobile robot.

The signal transmitter 420 is installed on a side of the charging stand and transmits a docking signal SD in a direction in which the main body of the mobile robot 1 docks.

The signal transmitter 420 transmits a docking signal SD so that the mobile robot approaches the charging stand and the charging terminal can be electrically connected.

An infrared signal may be applied as the docking signal SD.

Figure 6A:
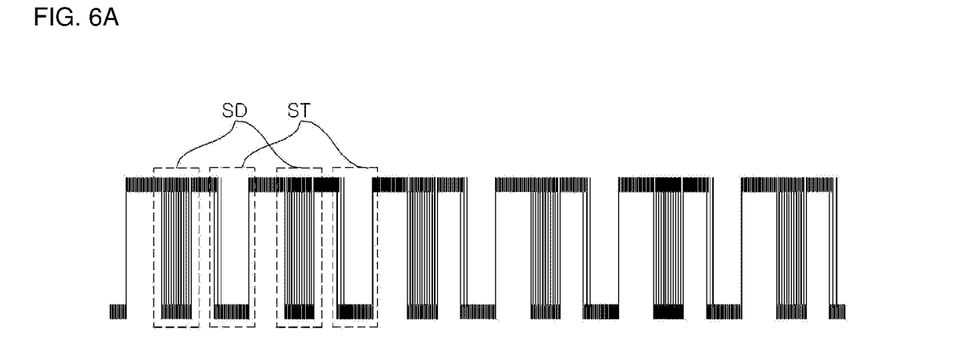
FIGS. 6A to 6C are views that are referred to describe a signal interference phenomenon of a sensing signal of the mobile robot according to an embodiment of the present disclosure and a docking signal.
Figure 6B:
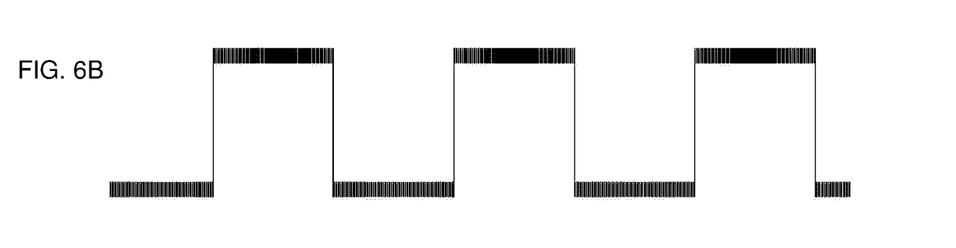
Figure 6C:
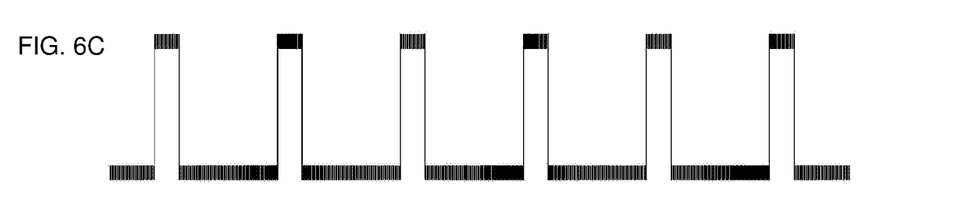

FIG. 6 is a view that is referred to describe a signal interference phenomenon of a sensing signal of the mobile robot according to an embodiment of the present disclosure and a docking signal.

As shown in FIG. 6 (a), since signals of the same wavelength are used, the docking signal SD and the sensing signal ST may overlap.

When the signals overlap, the control unit has difficulty in discriminate the docking signal and the sensing signal, so it is impossible to determine whether an obstacle is sensed and to return to the charging stand when it is needed.

Accordingly, the control unit 110 controls signal transmission cycles of the first to sixth sensors 281 to 286.

As in FIG. 6 (b), the charging stand outputs a docking signal with a cycle of about 123 ms.

The control unit 110 controls the signal transmission cycles of the first to sixth sensors 281 to 286 different from the signal transmission cycle of the docking signal for discrimination from the docking signal.

As shown in FIG. 6 (c), the control unit 110 can set signal transmission cycles for a plurality of sensors different from the signal transmission cycle of the docking signal of the charging stand. For example, the control unit 110 controls sensing signals to be transmitted with a cycle of 40 ms.

The control unit controls signal transmission cycles of a plurality of sensors using synchronization signals and power lines connected with the first to sixth sensors.

The control unit can minimize interference of signals by differently setting signal transmission cycles of the docking signal and the sensing signals.

When a sensing signal or a docking signal is input, the control unit 110 discriminates signals by determining whether the signal is a signal corresponding to a designated cycle.

When a docking signal is received before reaching the signal transmission cycle of the docking signal or when a sensing signal is received before reaching the signal transmission cycle of the sensing signal, the control unit can determine that noise is generated. When noise is generated, the control unit determines that a signal is sensed wrong.

When a signal is input at time other than a designated cycle, the control unit 110 can determine mis-sensing of a signal.

When mis-sensing of a signal is generated, the control unit 110 can control the sensors to stop operating for a predetermined time. While the sensors stop operating and do not transmit sensing signals, signal interference of sensing signals and a docking signal is not generated, so the docking signal can be normally received.

Further, the control unit 110 can reset the signal transmission cycles of the sensors by temporarily stopping operation of the sensors. Depending on cases, the control unit 110 can change the signal transmission cycles of the sensors.

Accordingly, the mobile robot 1 can prevent the mis-sensing phenomenon when a docking signal is input as a sensing signal or a sensing signal is input as a docking signal.

Figure 7:
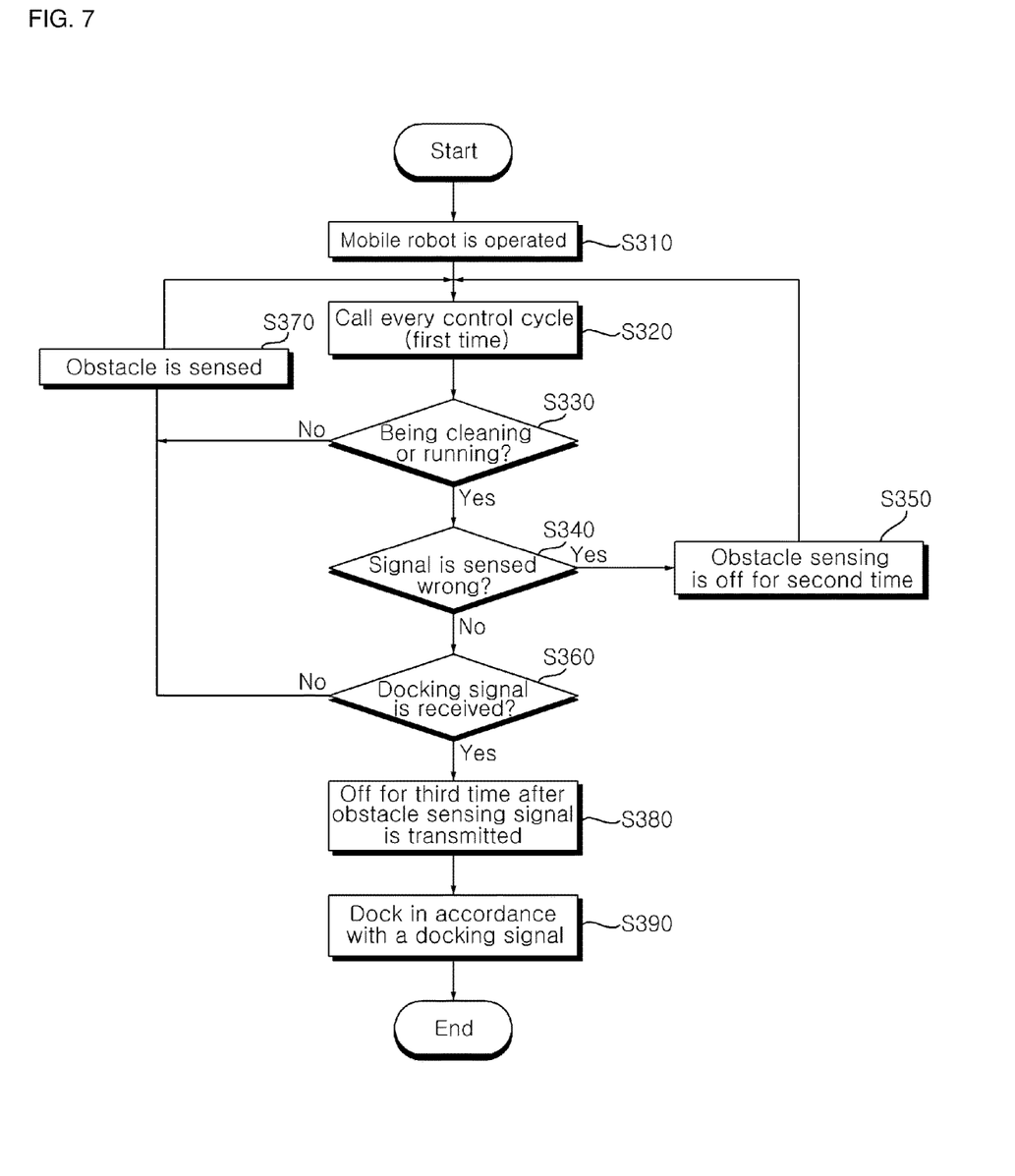
FIG. 7 is a flowchart showing a control method for signal processing of the mobile robot according to an embodiment of the present disclosure.

FIG. 7 is a flowchart showing a control method for signal processing of the mobile robot according to an embodiment of the present disclosure.

As shown in FIG. 7, the mobile robot 1 performs cleaning and operates while moving to a designated location or running in a set region in accordance with setting.

The control unit 110 controls a plurality of sensors to transmit sensing signals at a first time that is a designated control cycle (S320). Accordingly, the first to sixth sensors transmit sensing signals and recognize an obstacle through incident reception signals. The first time may be set in response to the transmission cycles of sensing signals.

When a control cycle is reached, the control unit 110 determines whether the main body is cleaning or is moved to a specific location (S330).

When being moving, even if the docking signal is received, the mobile robot 1 ignores the docking signal and controls the first to sixth sensors to transmit sensing signals and sense obstacles during running (S370).

The control unit 110 controls the first to sixth sensors to transmit sensing signals at every control cycle. The obstacle sensing unit can sense obstacles using pattern light separately from the first to sixth sensors of the sensor unit.

When the mobile robot is cleaning or moving to a destination and when the charging current of the battery is sufficient, the control unit 110 is not required to attempt docking, so it is possible to operate in accordance with sensing signals without considering a docking signal. The control unit 110 controls the running unit such that the main body moves by setting a running route in accordance with sensed obstacles by ignoring a docking signal even if the docking signal is received during cleaning or moving.

When the main body is not cleaning or moving, that is, when the main body returns to the charging stand for charging or stands by without a set operation, the control unit 110 determines whether a sensing signal is sensed wrong (S340).

When a sensing signal and the docking signal are simultaneously sensed and overlap each other, the control unit 110 determined that it is mis-sensing of a signal. Further, when a sensing signal is received to the docking signal receiving unit 270, when a sensing signal that is not a docking signal is recognized as a docking signal, and when the docking signal is sensed wrong as a sensing signal, the control unit 110 determines that a sensing signal is sensed wrong.

The control unit 110 can determine whether a signal is a sensing signal by comparing the pattern of a sensed signal, and can determined whether a signal is sensed wrong by determining whether it corresponds to the signal transmission cycles of a sensing signal and a docking signal.

When a docking signal is received before reaching the signal transmission cycle of the docking signal or when a sensing signal is received before reaching the signal transmission cycle of the sensing signal, the control unit can determine that noise is generated. When noise is generated, the control unit determines that a signal is mis-sensed.

When a sensing signal of an obstacle is sensed wrong, the control unit stops the first to sixth sensors 281 to 286 to stop operating for a second time (S350). The first to sixth sensors stand by without transmitting a sensing signal in accordance with a control instruction of the control unit.

The second time is set larger than the signal transmission cycles of sensing signals and it is preferable that the second time is set as time for which a sensing is not transmitted at least two times. The second time may be set as 80 to 120 ms. The second time may be set as 100 ms.

Since sensing signals of the first to sixth sensors are not transmitted, it is possible to prevent a sensing signal from being sensed wrong as a docking signal.

Meanwhile, when a control cycle is reached with a plurality of sensors stopping operation, whether a docking signal is received is determined (S360). When a docking signal is not received, it is possible to stand by until the next control cycle.

Further, when charging is required or a docking signal is received while attempting to dock, the control unit determines whether the docking signal is a normal signal.

When mis-sensing of an obstacle is not generated, the control unit 110 determines whether a received signal is a docking signal (S360).

When a docking signal is not received, sensing of an obstacle through sensing signals of the first sensor to sixth sensor is performed (S370). It is determined that the mobile robot 1 does not approach the charging stand, so it is possible to keep running to return to the charging stand while sensing obstacles.

When a docking signal is received while attempting to dock, the control unit 110 stops sensing of obstacles (S380). The control unit 110 controls the first to sixth sensors 281 to 286 to output a sensing signal one time and then controls the first to sixth sensors 281 to 286 to stop operating.

The control unit controls the first to sixth sensors to stop sensing obstacles in order to prevent signal interference during docking.

The first to sixth sensors transmit a sensing signal and then stand by without transmitting a sensing signal for a third time in accordance with a control instruction of the control unit. The third time may be set on the basis of time for which docking is attempted in accordance with a docking signal or time that is taken for docking. The third time may be set as about 150 ms.

The control unit 110 senses surrounding obstacles through sensing signals before docking with the charging stand. The control unit 110 can determine the distance from the charging stand through sensing signals.

The control unit controls the running unit in response to a docking signal (S390). Accordingly, the main body docks with the charging stand and is connected with the charging terminal, so a charging current is supplied.

Accordingly, the mobile robot differently sets the cycles of sensing signals and a docking signal and discriminates sensing signals and a docking signal in response to the cycles of the sensing signals and the operation state of the main body. When a signal is sensed wrong, it is possible to prevent mis-sensing of a signal by stopping sensing of obstacles.

Further, it is possible to prevent a docking signal is sensed wrong by controlling operation of sensing signals when docking with the charging stand.

Figure 8:
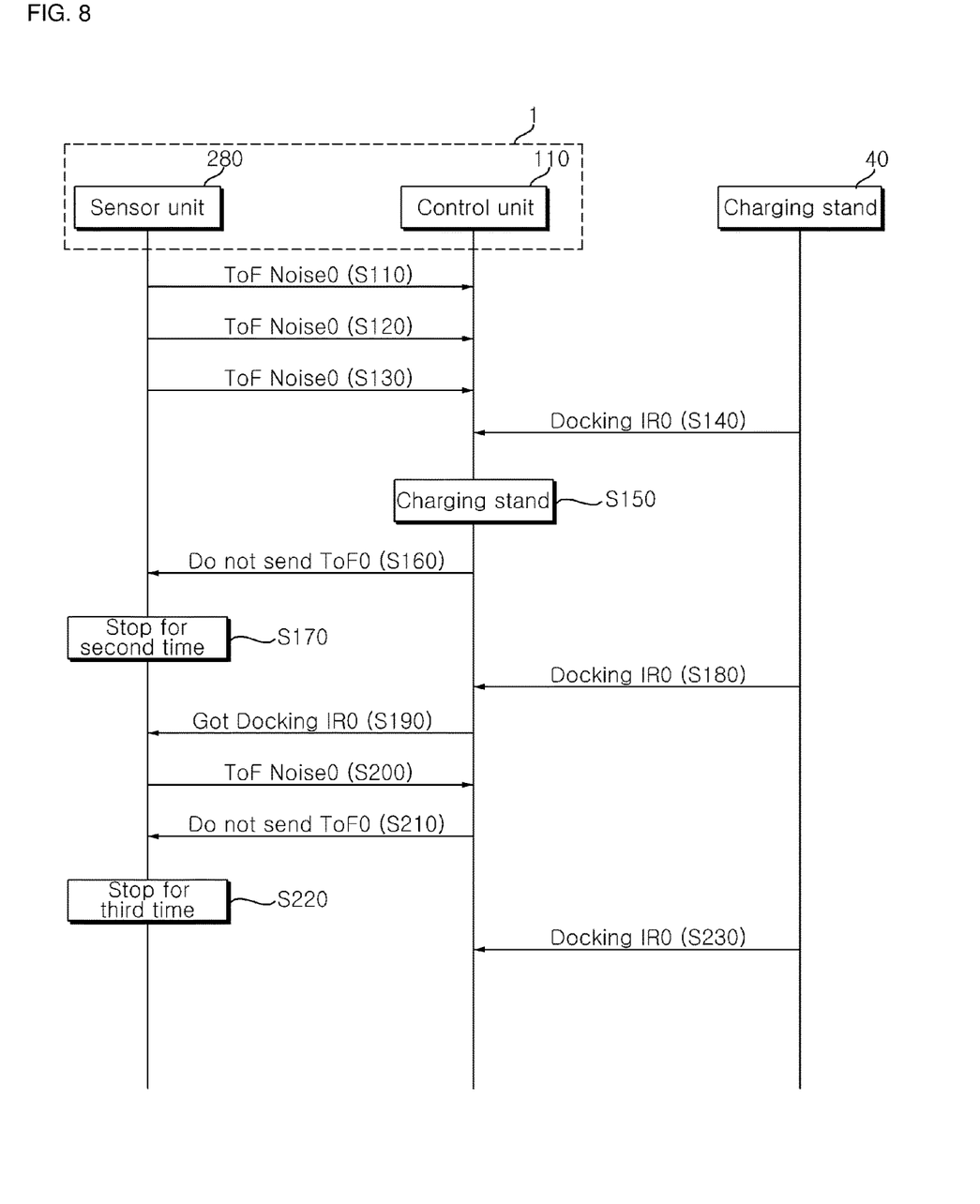
FIG. 8 is a flowchart showing signal flow of the mobile robot according to an embodiment of the present disclosure and a charging stand.

FIG. 8 is a flowchart showing signal flow of the mobile robot according to an embodiment of the present disclosure and a charging stand.

As shown in FIG. 8, when the first to sixth sensors 281 to 286 transmit sensing signals and the charging stand 40 transmits a docking signal, the control unit 110 senses an obstacle and attempts to dock in accordance with the received signals.

The first to sixth sensors 281 to 286 transmit sensing signals in accordance with the designated signal transmission cycle (S110 to S130).

The charging stand 40 transmits a docking signal in accordance with the designated signal transmission cycle (S180) (S230).

When sensing signals are reflected by an obstacle and received to the receivers of the sensors, respectively, the sensors input sensor values into the control unit 110. The control unit 110 determines whether an obstacle is positioned in the running direction or the location of an obstacle in accordance with the input sensor values.

When a sensing signal is received even though a sensing signal is not transmitted from a sensor, the control unit 110 can determine that noise is generated by determining that a copy signal of the sensing signal or a docking signal is received.

Further, when sensing signals transmitted from the first to sixths sensors and a docking signal of the charging stand are received to the docking signal receiving unit 270, the control unit 110 determines noise due to overlap of signals (S140).

When noise is generated (S150), the control unit 110 determined mis-sensing of a signal and applies a control instruction such that the first to sixth sensors stops sensing obstacles for the second time (S160).

The first to sixth sensors 281 to 286 stop operating and stand by for the second time in accordance with the control instruction (S170). The second time may be set as about 100 ms.

When a docking signal is received with the first to sixth sensors 281 to 286 stopped (S180), the control unit 110 transmits a control instruction for docking to the first to sixth sensors 281 to 286 (S190).

The first to sixth sensors 281 to 286 output sensing signals one time in accordance with the control instruction for docking (S200). The control unit can calculate the distance from the charging stand in accordance with the sensing signals.

The control unit 110 applies a control instruction such that the first to sixth sensors 281 to 286 stop operating for the third time (S210).

The first to sixth sensors 281 to 286 stand by without transmitting sensing signals for the third time. The third time may be set as about 150 ms.

Accordingly, the mobile robot can prevent interference of signals by determining noise and stopping transmission of signals from the sensors when signals overlap. Further, when docking with the charging stand, the mobile robot can dock with the charging stand in accordance with a docking signal by stopping the sensors.

The mobile robot according to the embodiment which operates as described above may be implemented in an independent hardware device type and may be driven in a type included in microprocessors as at least one or more processors or another hardware device such as a common computer system.

The above description merely explains the spirit of the present disclosure and the present disclosure may be changed and modified in various ways without departing from the spirit of the present disclosure by those skilled in the art. Accordingly, the embodiments described herein are provided merely not to limit, but to explain the spirit of the present disclosure, and the spirit of the present disclosure is not limited by the embodiments.

The invention claimed is:

1. A mobile robot comprising:
a main body running in a region;
a sensor unit disposed on a front of the main body and sensing an obstacle located at a predetermined distance from the main body by transmitting a sensing signal;
a docking signal receiver receiving a docking signal that is transmitted from a charging stand;
a running unit controlling running of the main body; and
a control unit determining the location of an obstacle in response to the sensing signal, controlling running in response to an obstacle, and controlling the running unit to dock with the charging stand in accordance with the docking signal if charging is required,
wherein the control unit controls the sensor unit to transmit the sensing signal with a cycle different from a signal transmission cycle of the docking signal, and determines that a signal is sensed wrong and stops operation of the sensor unit for a predetermined time when noise is generated due to an overlap of the docking signal and the sensing signal.

2. The mobile robot of claim 1, wherein the control unit senses an obstacle and controls the running unit in accordance with the sensing signal of the sensor unit regardless of the docking signal when the main body is cleaning or moving to a destination.

3. The mobile robot of claim 1, wherein the control unit controls the mobile robot to return to the charging stand when charging is required or in accordance with the docking signal that is received during standby.

4. The mobile robot of claim 1, wherein
the control unit transmits a control instruction according to docking to the sensor unit when charging is required or when the docking signal is received while attempting to dock, and
the sensor unit transmits the sensing signal one time and stops operating for a predetermined time in response to the control instruction according to docking.

5. The mobile robot of claim 4, wherein
the control unit calculates the location of the charging stand using the sensing signal transmitted one time, and
the running unit runs and docks with the charging stand in accordance with the docking signal.

6. The mobile robot of claim 1, wherein when the docking signal is received, the control unit determines whether the docking signal is a normal signal or a signal is sensed wrong in accordance with a signal pattern of the docking signal.

7. The mobile robot of claim 1, wherein when the docking signal is received, the control unit determines whether the docking signal is a normal signal or a signal is sensed wrong through comparison with a signal transmission cycle of the docking signal.

8. The mobile robot of claim 1, wherein the control unit determines that noise is generated when the docking signal is received before a signal transmission cycle of the docking signal is reached.

9. The mobile robot of claim 1, wherein the control unit determines that noise is generated when the sensing signal is received before a signal transmission cycle of the sensing signal is reached.

10. The mobile robot of claim 1, wherein when noise is generated, the control unit determines that a signal is sensed wrong and resets a signal transmission time point of a sensor by stopping operation of the sensor unit for a designated stop time.

11. The mobile robot of claim 10, wherein the control unit sets the stop time such that the sensor unit stops for time corresponding to at least two times a signal transmission cycle of the sensing signal.

12. The mobile robot of claim 1, wherein the sensor unit includes a first sensor to a sixth sensor disposed on a front of the main body circumferentially with regular intervals around the center of a front surface.

13. The mobile robot of claim 12, wherein the first sensor to the sixth sensor are Time of Flight (TOF) sensors.

14. The mobile robot of claim 1, wherein the docking signal and the sensing signal are signals of the same wavelength.

* * * * *